United States Patent [15] 3,700,076
Forsting et al. [45] Oct. 24, 1972

[54] SIDE PROTECTION DEVICE FOR MOTOR VEHICLES

[72] Inventors: Bernard Forsting, Rheydt; Edmund Hellriegel, Cologne; Dieter Pfadenhauer, Pulheim, all of Germany

[73] Assignee: Ford Motor Company, Dearborn, Mich.

[22] Filed: Oct. 16, 1970

[21] Appl. No.: 81,351

[30] Foreign Application Priority Data

Nov. 29, 1969 Germany..........P 19 59 989.4

[52] U.S. Cl. ..................188/1 C, 49/502, 293/63
[51] Int. Cl. ..............................................F16f 7/12
[58] Field of Search..................52/630; 188/1 C; 49/501–503; 293/1, 54 D, 63; 296/152

[56] References Cited

UNITED STATES PATENTS

| 1,214,892 | 2/1917 | Budd | 49/503 |
| 2,465,936 | 3/1949 | Schultz | 188/1 C UX |
| 2,578,903 | 12/1951 | Smith | 188/1 C |
| 3,530,959 | 9/1970 | Kopp | 188/1 C |

Primary Examiner—Duane A. Reger
Attorney—John R. Faulkner and John J. Roethel

[57] ABSTRACT

Side impact protection for motor vehicle bodies, particularly for the doors of the passenger compartment to restrict the depth of penetration of an impacting vehicle. A band-shaped energy absorbing element is arranged contiguous to the inner surface of an outer door panel and is anchored on the door end walls.

6 Claims, 3 Drawing Figures

PATENTED OCT 24 1972　　　　　3,700,076
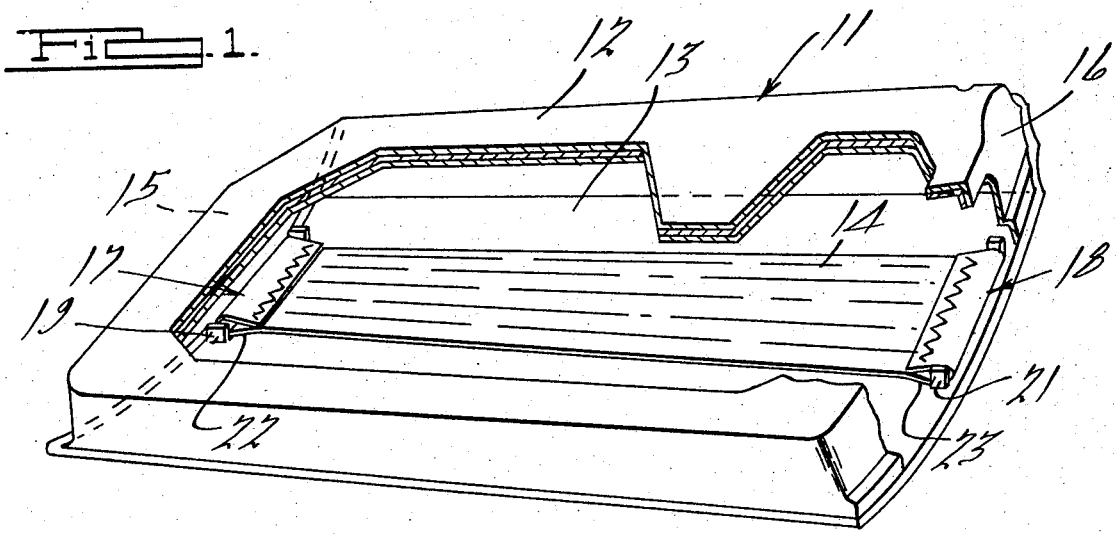
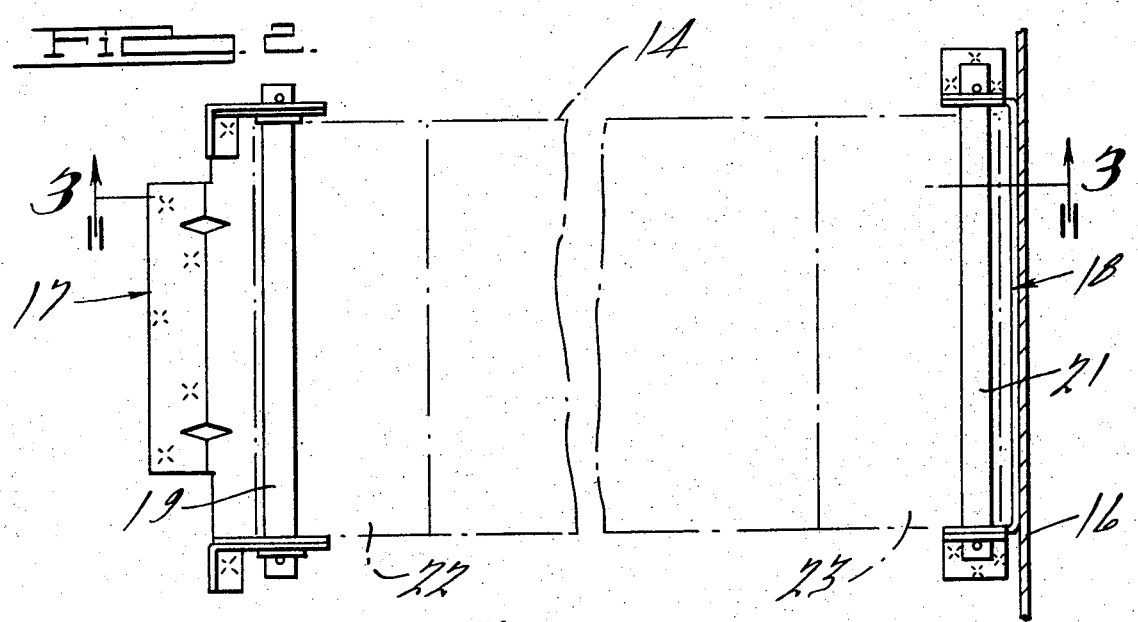
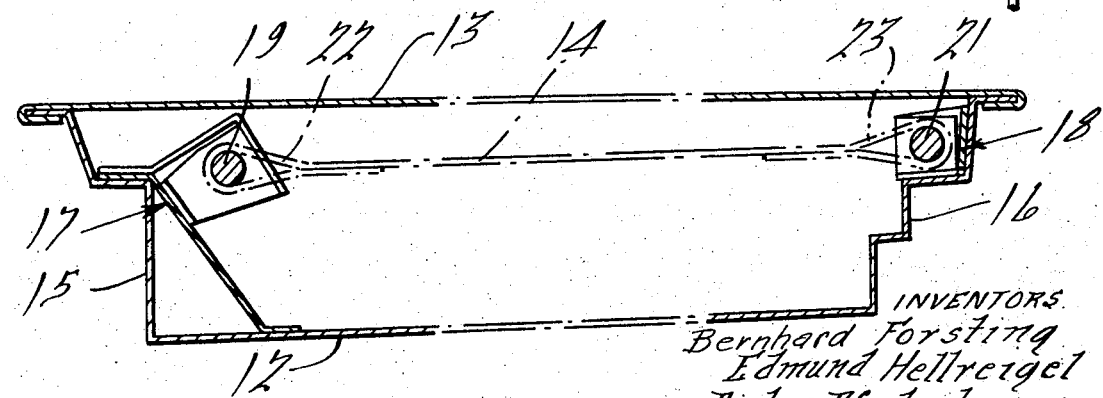
INVENTORS.
Bernhard Forsting
Edmund Hellreigel
Dieter Pfadenhauer
BY
John R. Faulkner
John J. Roethel
ATTORNEYS.

SIDE PROTECTION DEVICE FOR MOTOR VEHICLES

BACKGROUND OF THE INVENTION

It is already known, in the context of the provision of side protection for a motor vehicle to cope with the eventuality of a collision from the side, to incorporate in the doors of the vehicle behind the exterior panel thereof side protector beams made of profiled sheet metal. These side protection beams have improved side protection of conventional motor vehicles considerably. They are effective to prevent dangerously deep penetration of an impacting vehicle into the passenger space of an impacted vehicle in a collision in which the latter is struck in a direction substantially perpendicular to its fore-and-aft direction of movement.

These known side protective beams made of profile sheet metal are open to the drawback, however, that they are relatively heavy and thus the weight of the vehicle is considerably increased by extensive side protection of this type.

The object of the present invention is to overcome this drawback of the known side protection beams and to provide a side protection facility which is equally protective but substantially lighter and cheaper.

SUMMARY OF THE INVENTION

In accordance with the present invention, the foregoing object is achieved in that in close proximity to the inner surface of the external door panel there is arranged a strip-like, energy absorbing element extending substantially parallel to said panel preferably in the fore-and-aft direction of the vehicle, this element being anchored to the door ends.

The strip-like energy absorbing element can, in this context, preferably consist of a belt or band of synthetic material or woven synthetic material, preferably a polyester weave which has been subjected to a shrinkage treatment or prestressing treatment.

The strip-like energy absorbing element can, however, equally well be a belt or band of woven soft steel wire.

The ends of the strip-like energy absorbing elements can be secured to the door ends by anchoring devices in the form of pins which pass through loops on the ends of the bands. These loops may be produced by sewing, weaving or plaiting. The belt or band ends, could for that matter, be secured by means of a clamp and/or adhesive connection.

The particular advantage of the side protector in accordance with the present invention resides in its low weight, the small amount of space which it occupies, and its low manufacturing cost. Through appropriate shrinkage or prestressing treatment of the belt or woven polyester which is used, the desired energy absorption and permissable elongation can easily be varied to accord with requirements.

DESCRIPTION OF THE DRAWING

The present invention will be explained in greater detail making reference to an example illustrated in the attached drawings, wherein:

FIG. 1 illustrates an oblique view of a vehicle door with part of the interior panel cut-away to reveal the side protector embodying the present invention;

FIG. 2 illustrates a side elevation of the anchoring device used to anchor the side protection; and FIG. 3 illustrates a section on the line 3—3 of FIG. 2.

DETAILED DESCRIPTION OF THE INVENTION

The vehicle door, generally designated 11 shown in FIG. 1 consists essentially of an internal door panel 12 and an external door panel 13. Immediately contiguous the inner surface of the external panel 13 there is provided a strip-like energy absorbing band or belt 14 extending substantially parallel to the surface of the panel 13 in the fore-and-aft direction of the vehicle. This belt or band 14 is anchored to the vertical ends 15 and 16 of the door by anchoring devices 17 and 18. These devices 17 and 18 preferably are welded to the door end 15 and 16 and accommodate pins 19 and 21, respectively, around which the ends of the strip-like energy absorbing band or belt are looped. The loops 22 and 23 at the end of the band or belt 14 are formed by sewing, weaving or plaiting. The energy absorbing band or belt 14 may be made of a synthetic material such as strands of polyester plastic or of steel wire. The material may be woven or plaited to achieve the desired strength. In addition, the material may be pre-stressed to give any desired energy absorption characteristic.

The two ends of the strip-like energy absorbing belt or band 14 within the scope of this invention could be advantageously secured to the vertical door ends 15 and 16 by a clamp connection and/or by an adhesive connection.

It is to be understood that this invention is not limited to the exact construction illustrated and described above but that various changes and modifications may be made without departing from the spirit and scope of the invention as defined in the appended claims.

We claim:

1. A side protector for a motor vehicle body structure such as a vehicle door having an exterior panel and end walls at each end of the panel,
   wherein the improvement comprises:
   a non-rigid strip of energy absorbing material extending substantially parallel and contiguous to the inner surface of the exterior panel in a direction substantially fore-and-aft of the body structure,
   the strip of energy absorbing material having a loop at each end,
   and securing means anchoring the strip at each of its ends to respective end walls of the body structure,
   the securing means comprising a pin received in each loop,
   each pin being anchored to the door structure adjacent the respective end wall of the latter.

2. A side protector according to claim 1, in which:
   the strip of energy absorbing material is a band of steel wire strands.

3. A side protector according to claim 1, in which:
   the energy absorbing material is a band of synthetic material.

4. A side protector according to claim 1, in which:
   the energy absorbing material is a band of woven synthetic material.

5. A side protector according to claim 4, in which:
   the woven synthetic material is a pre-stressed polyester weave.

6. A side protector according to claim 1, in which:
the strip of energy absorbing material is a strip of plaited steel wire.

* * * * *